United States Patent [19]

Wilson et al.

[11] 4,354,297
[45] Oct. 19, 1982

[54] MACHINE FOR PROCESSING FISH

[75] Inventors: David G. Wilson, Cambridge, Mass.; William B. Hoff, III, Winnetka, Ill.; Roy V. Richard, II, Natick, Mass.

[73] Assignee: Massachusetts Institute of Technology, Cambridge, Mass.

[21] Appl. No.: 135,345

[22] Filed: Mar. 31, 1980

[51] Int. Cl.³ .............................................. A22C 25/17
[52] U.S. Cl. .......................................... 17/54; 17/62; 17/21
[58] Field of Search .................... 17/66, 54, 50, 21, 62

[56] References Cited

U.S. PATENT DOCUMENTS 1,867,133 7/1932 Bisset ...................................... 17/62
4,025,986 5/1977 Koken ..................................... 17/21
4,084,292 4/1978 Harlan et al. ........................ 17/21 X

FOREIGN PATENT DOCUMENTS 248623 3/1926 United Kingdom ..................... 17/62

OTHER PUBLICATIONS

Bureau of Fisheries, Dept. of Commerce, "Preparation of Hides of Sharks for the Tanner", 2 pages, Mar. 10, 1930.

Primary Examiner—Willie G. Abercrombie
Attorney, Agent, or Firm—Arthur A. Smith, Jr.; Leo R. Reynolds

[57] ABSTRACT

A fluid power operated fish skinning machine that severs the tail and impales the fish on a wheel. The fish is then rotated past cutting stations where the dorsal fins are removed and the belly flap is cut. The wheel is then stopped opposite a cutting wheel mounted on a drum which is rotatable about its axis in either direction and is pivotable against or away from the fish body. The drum is pivoted against the fish and a transverse slit is made by the cutting wheel in the fish across the backbone near the head of the fish. The drum is then rotated until a gripping device on the drum is disposed in the slit. The gripping device is then pivoted against the drum and grips the skin against the outer surface of the drum. The drum and wheel are then rotated in opposite directions about their axes such that the skin is peeled from the fish.

17 Claims, 12 Drawing Figures

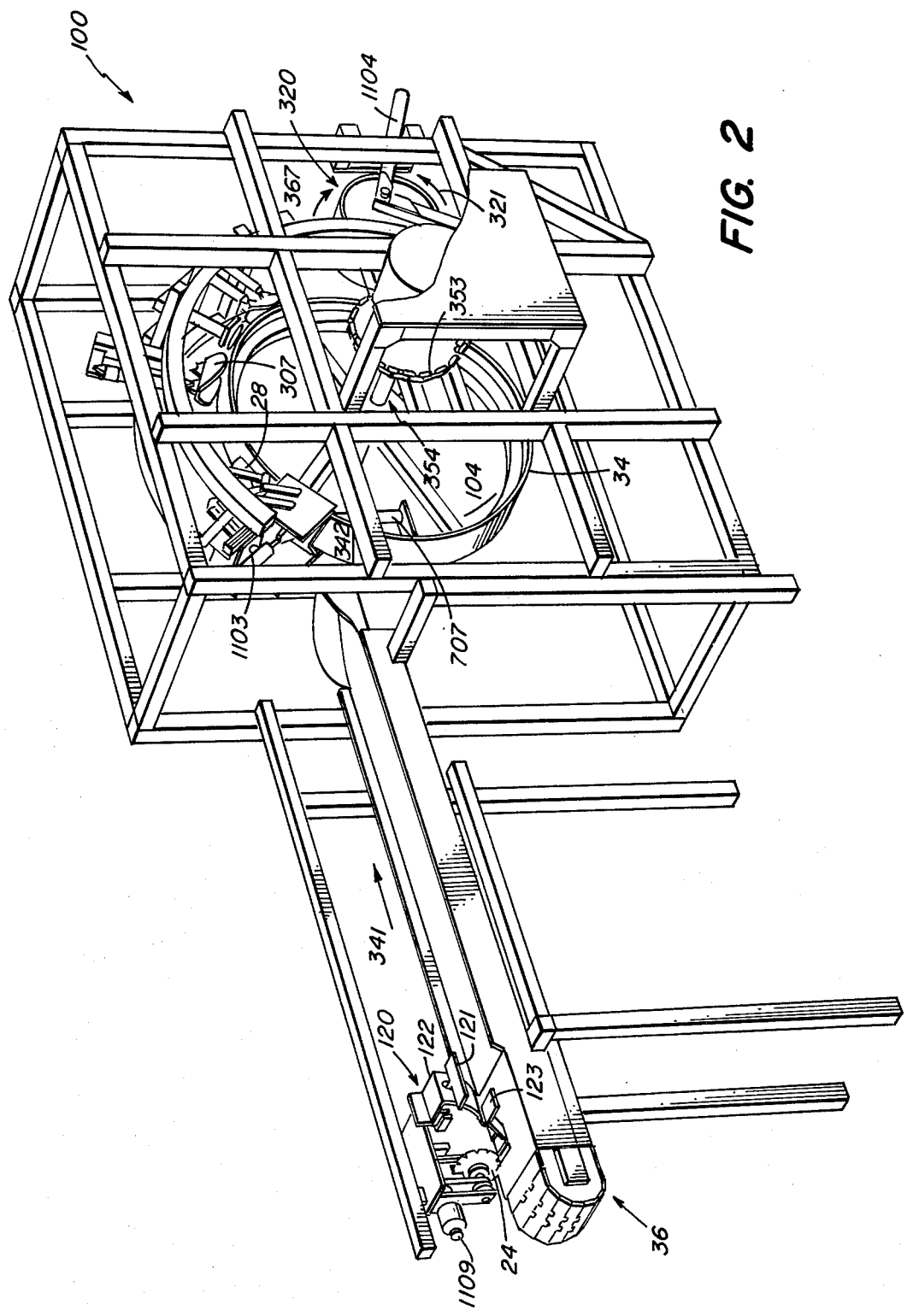

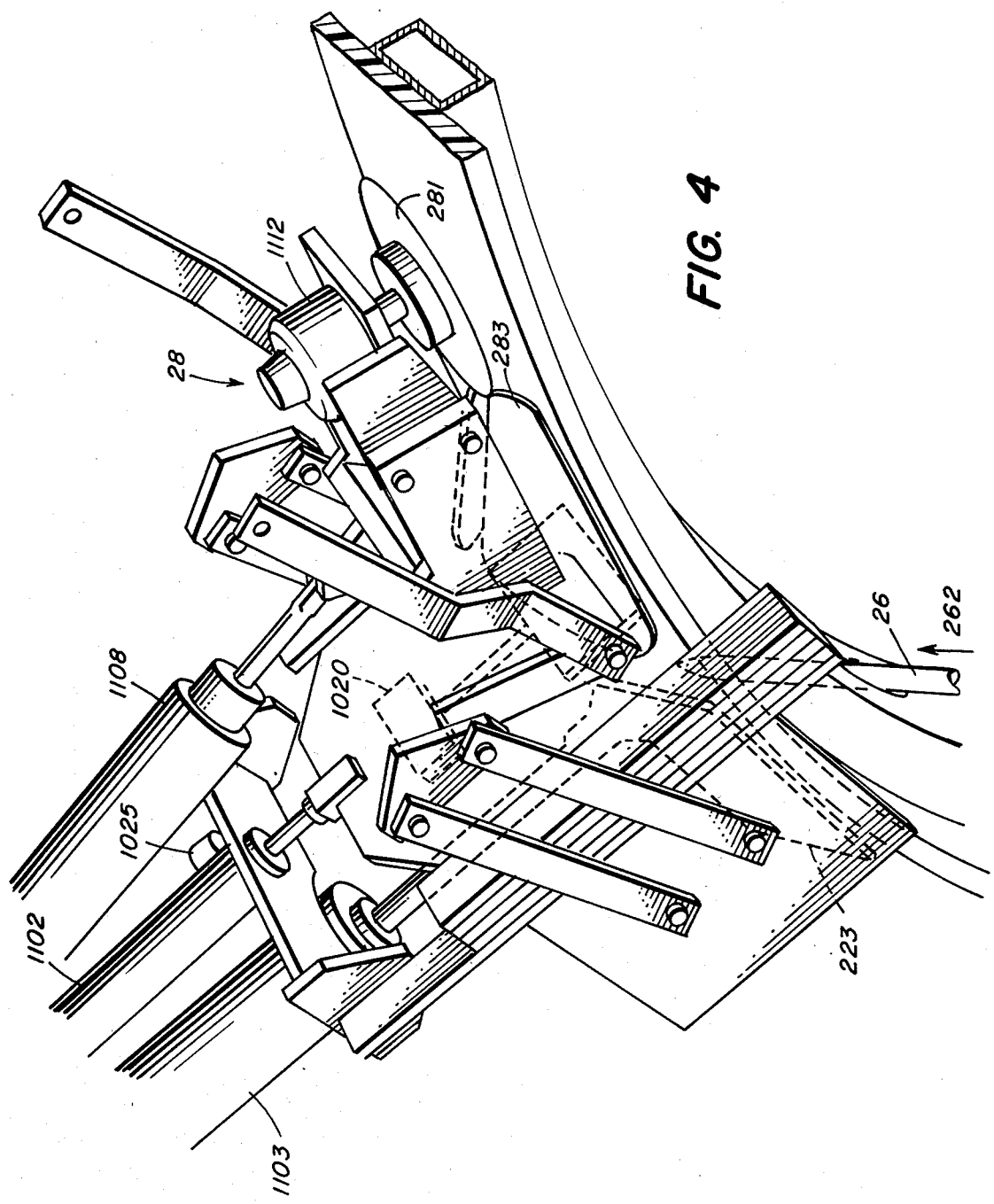

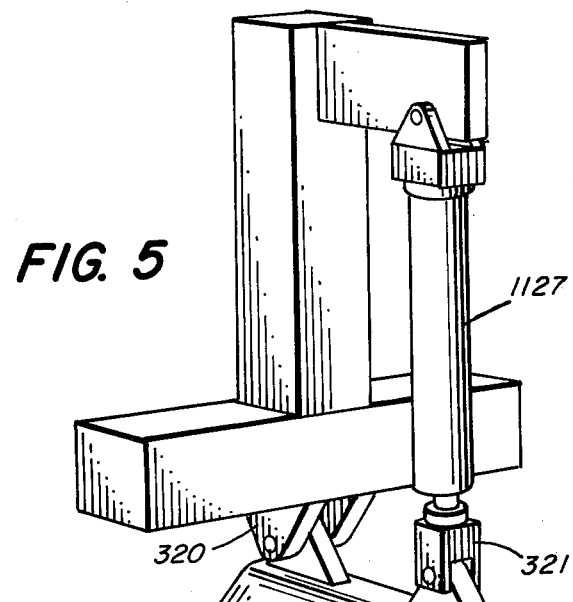
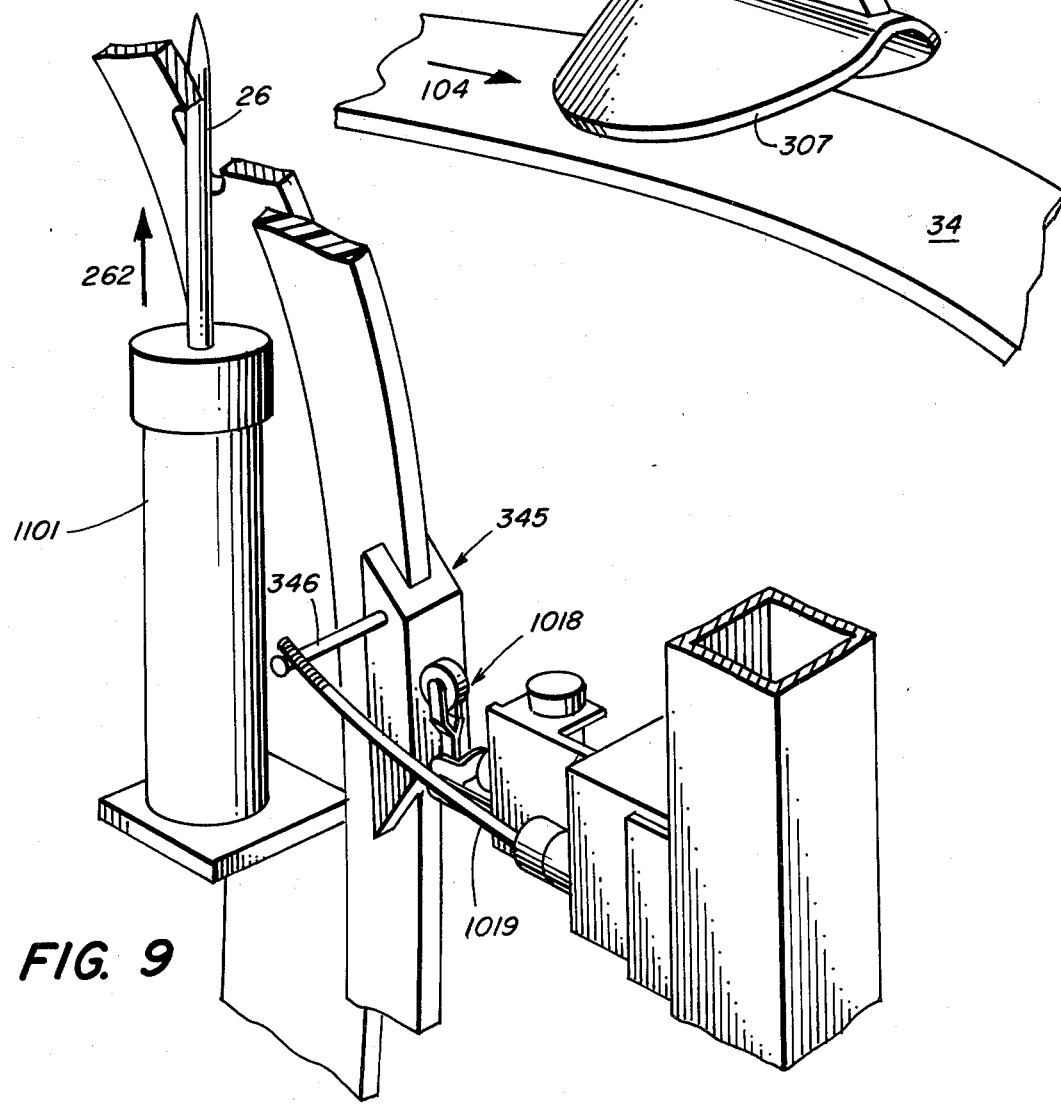
FIG. 5
FIG. 9

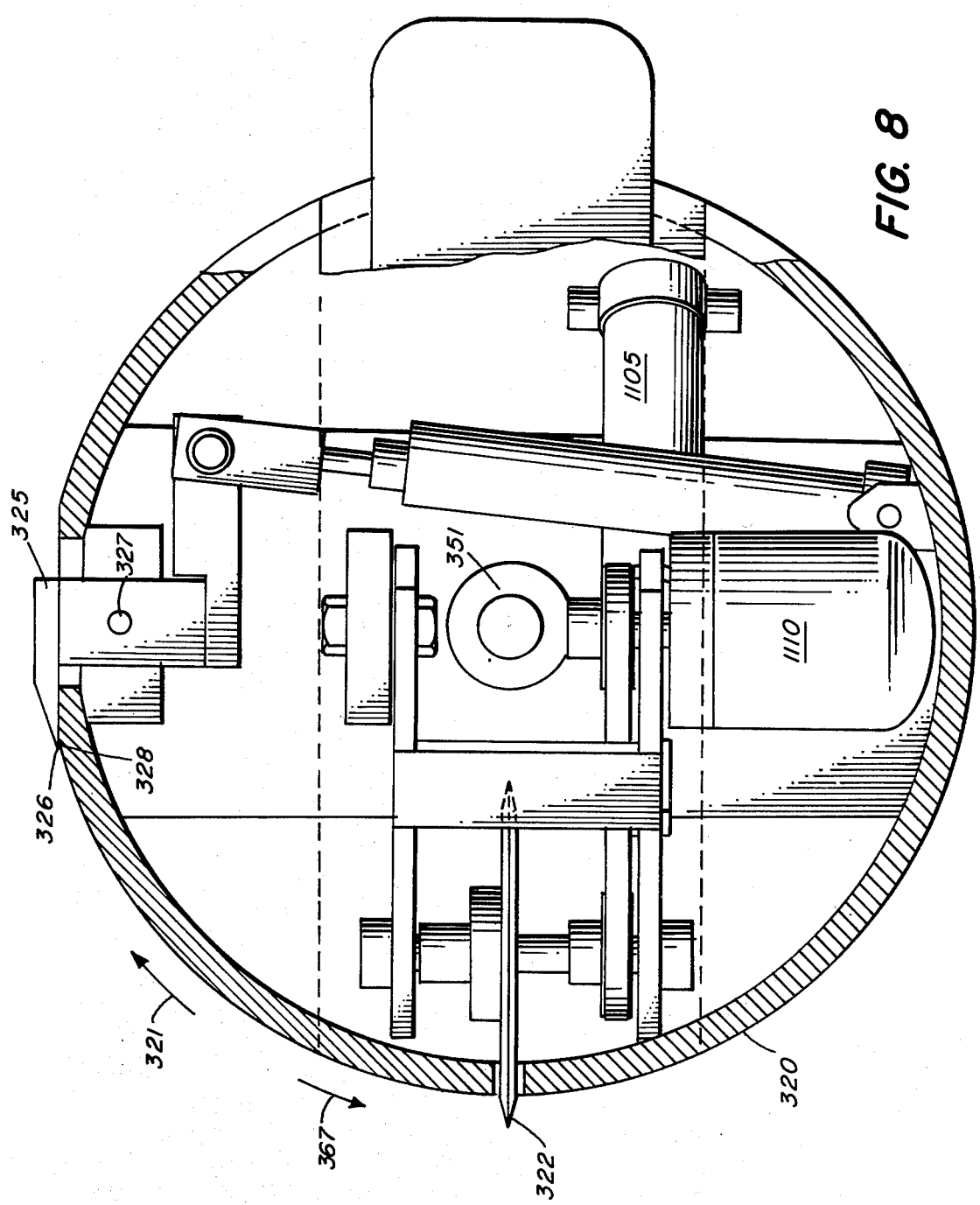

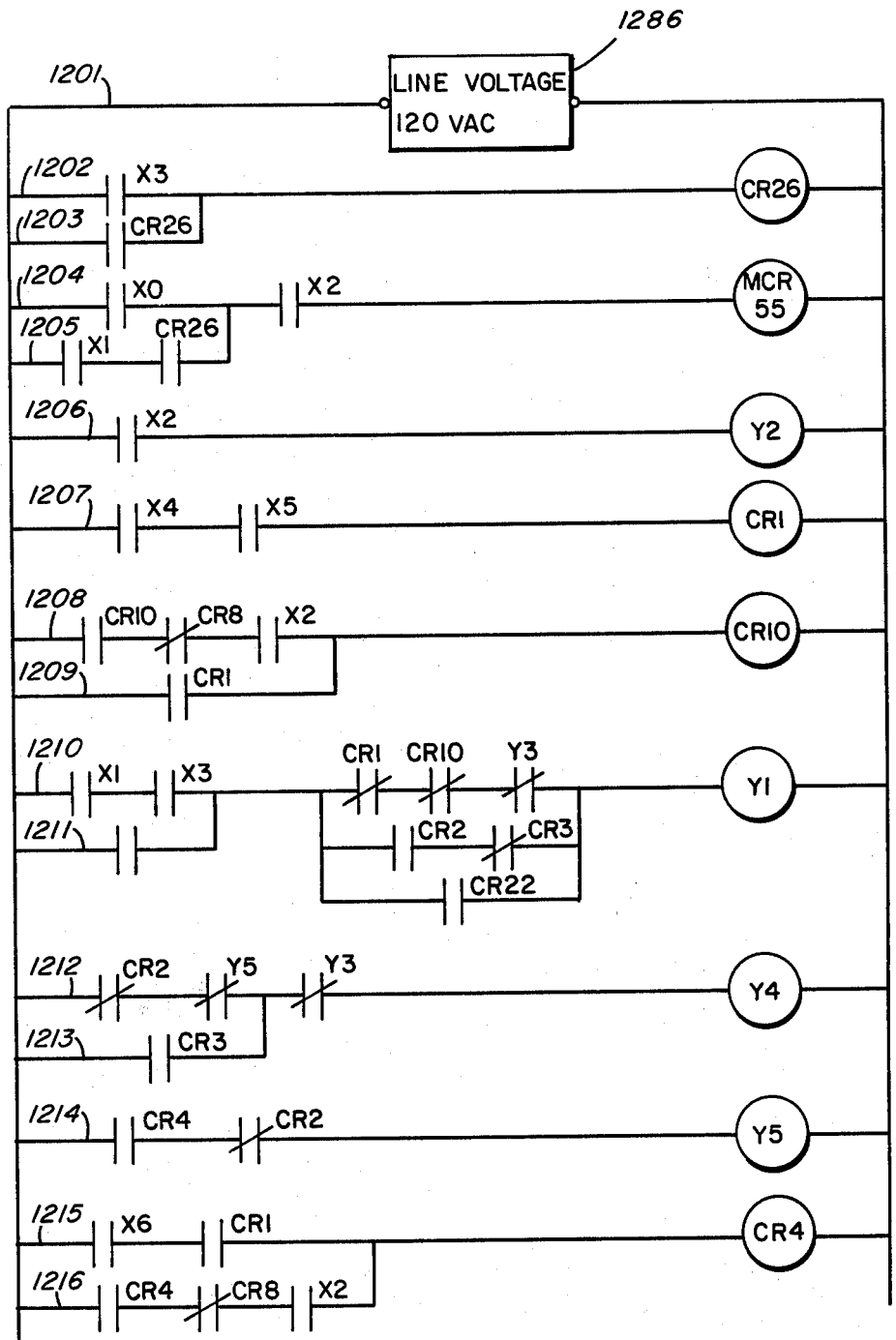
FIG. 12 Sheet 1

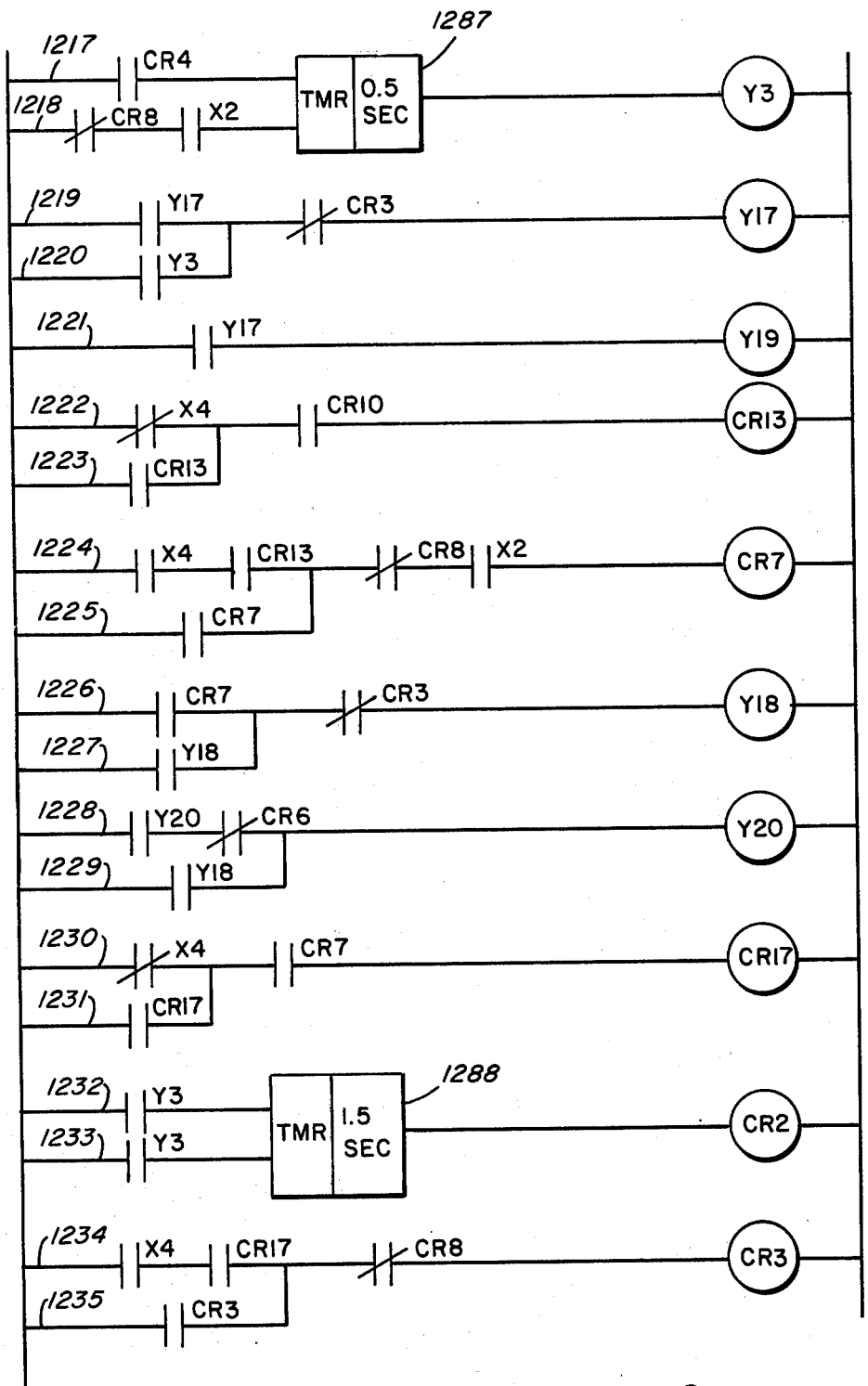
FIG. 12 Sheet 2

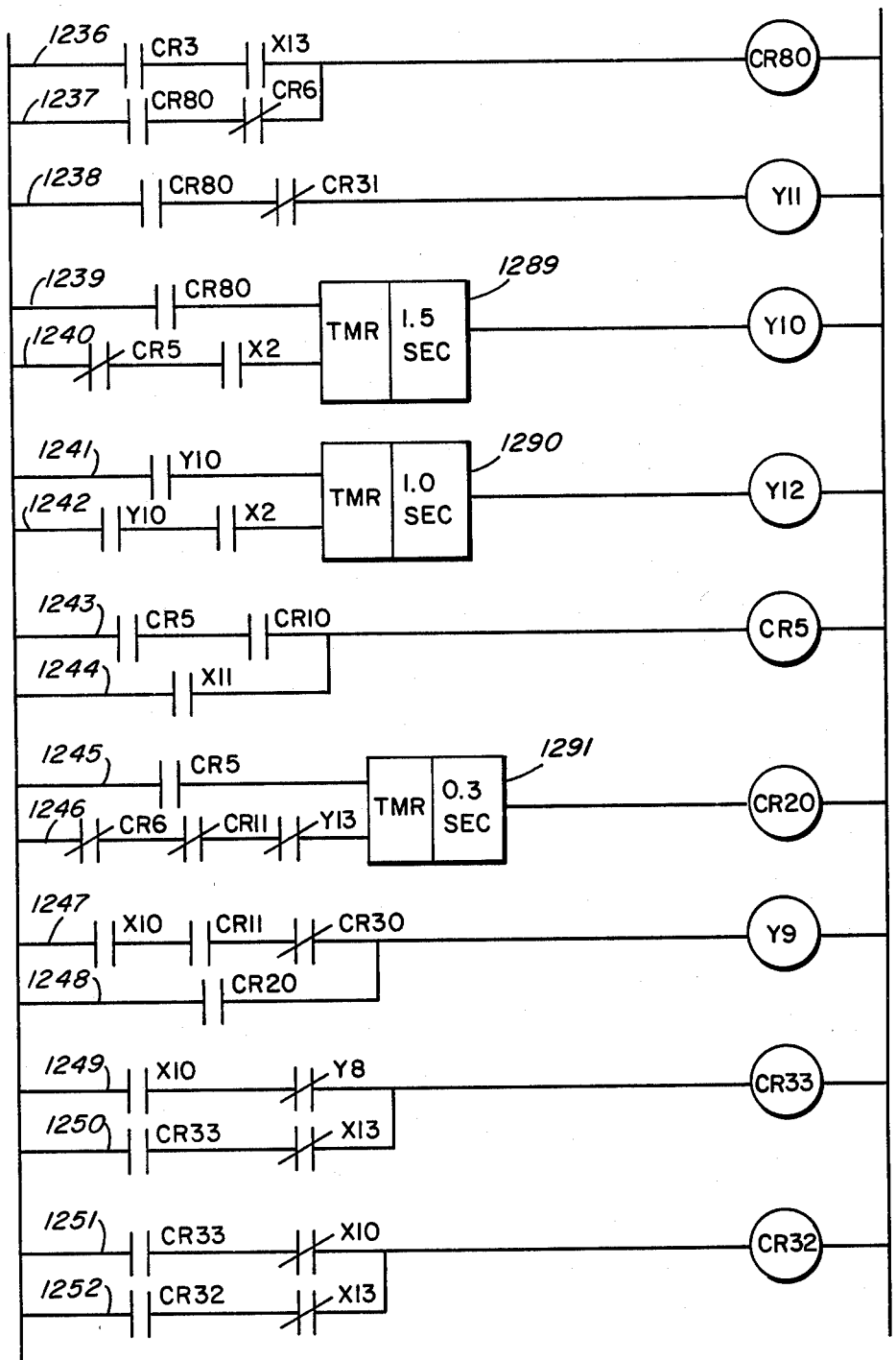
FIG. 12 Sheet 3

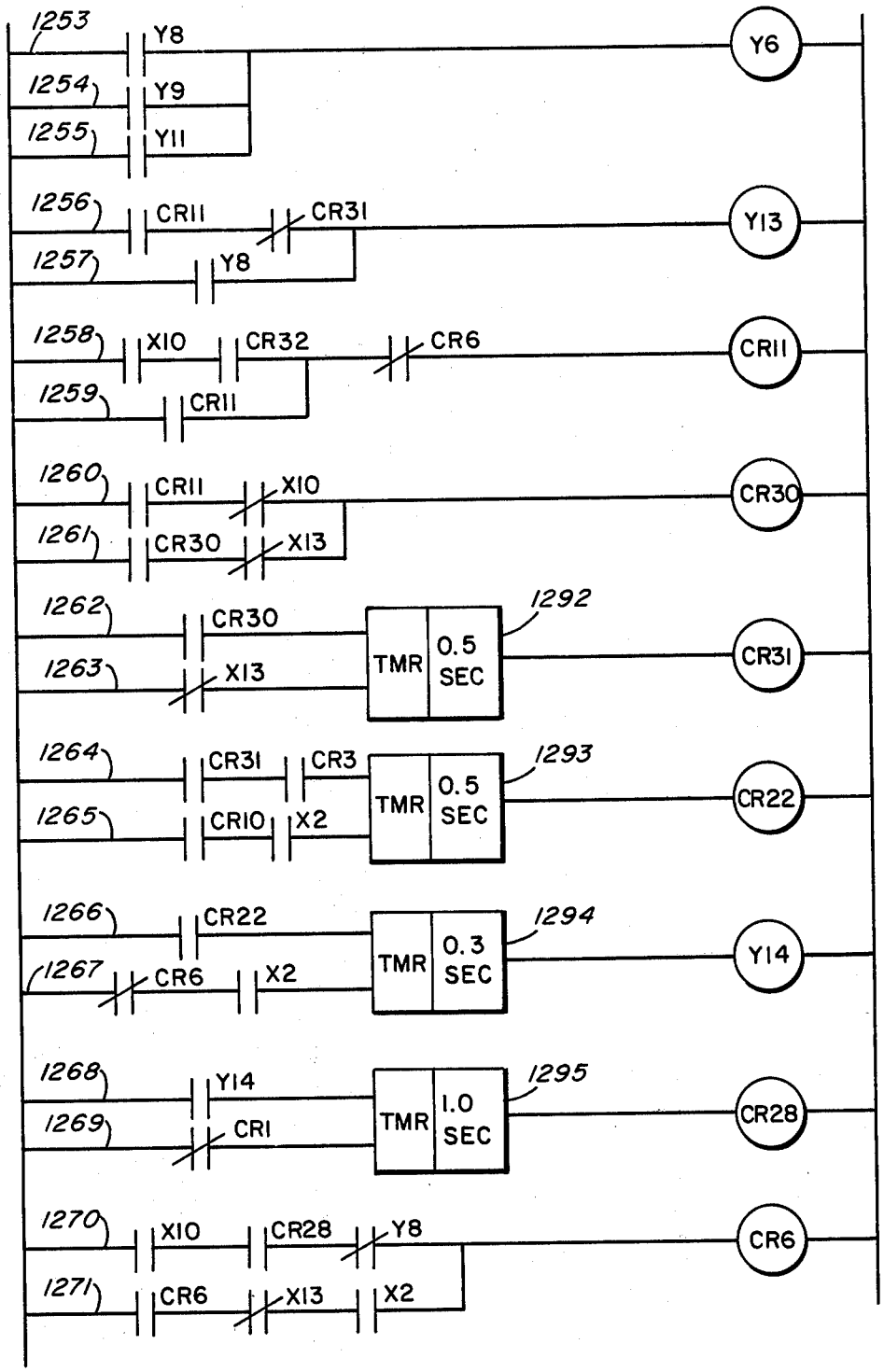
FIG. 12 Sheet 4

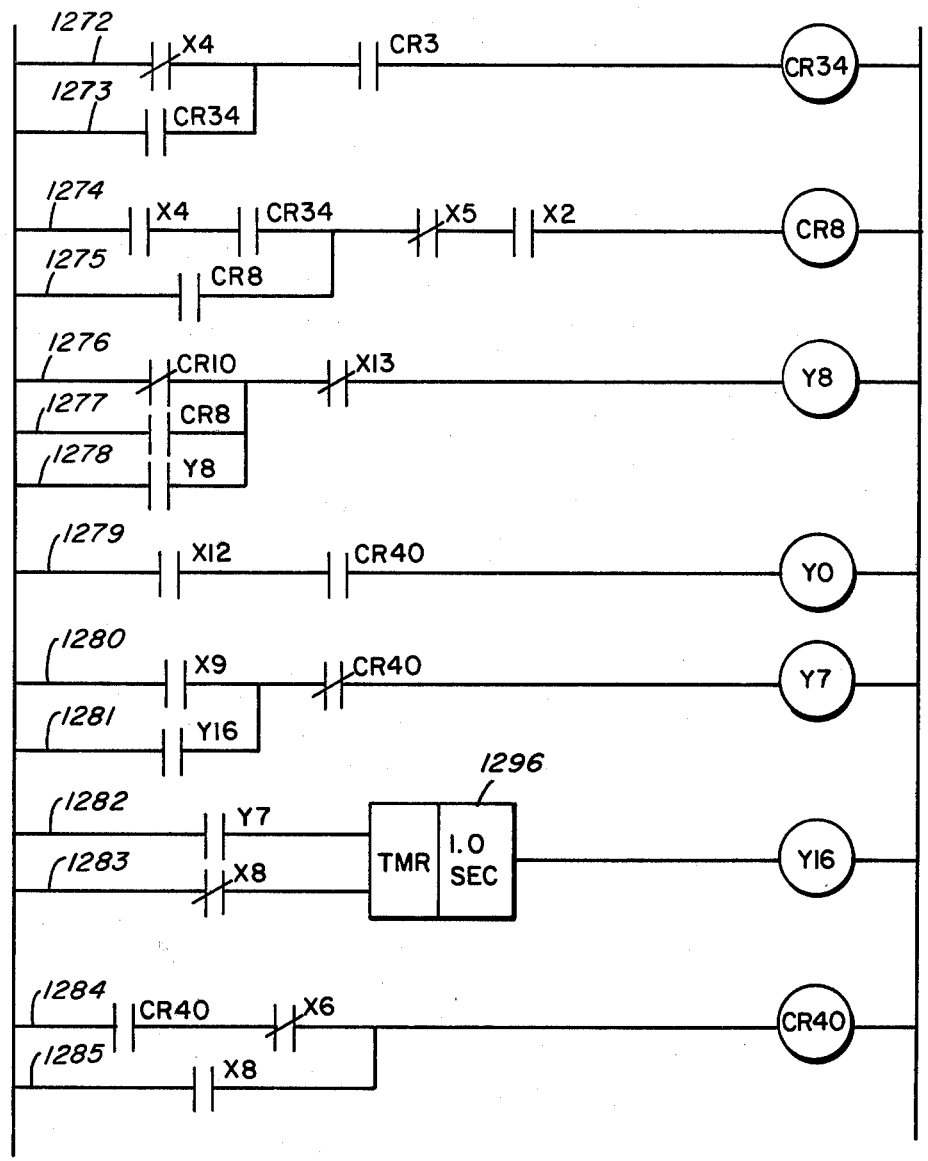
FIG. 12 Sheet 5

4,354,297

MACHINE FOR PROCESSING FISH

This invention was made in the course of work supported by the Department of Commerce, National Oceanic and Atmospheric Administration, Office of Sea Grant, Contract Number 04-7-158-44079.

DESCRIPTION

1. Technical Field

The present invention relates to machines for processing fish, particularly dogfish sharks.

2. Background Art

The dogfish is a species of shark. It is a staple food in many countries of Europe. Recent changes in the nature of the work force have resulted in a decrease in the number of persons who serve as fish cutters in the European fish business, those who remove the skin, entrails and so forth, of a whole fish to render it suitable for packaging and marketing.

Dogfish are plentiful in the coastal waters abounding in the United States. However, it has been uneconomical in the United States for many years to handskin or manually skin the dogfish. To our knowledge, there are no machines commercially available which will automatically remove the extremely tough skin from the whole or "round" fish. Yet, if the fish is to be shipped elsewhere, such as Europe for processing, it is essential that the skin first be promptly removed from dead fish. The dogfish excretes its urine through its skin, and the skin decays very fast once the fish has died, imparting a strong small and off-flavor to the rest of the fish within several hours of death.

In the apparatus of the present invention, a machine and process is provided that, on one pass therethrough, functions to remove all or most of the parts of a dogfish ordinarily removed prior to packaging.

The present invention also minimizes the need for hand labor, and substantially reduces the processing cost and time. It also provides certain unique safety and control features as will subsequently be explained.

It is additionally noted that machines are available which will, with some difficulty, remove the skins from dogfish once they have been reduced to fillets. These machines operate on an abrasive principle, however, and there are several disadvantages to using such machines. First, it takes almost as much hand labor to fillet dogfish as to remove the skins from the fish in the round and to fillet them subsequently. Accordingly, using machines just to remove the skins from fillets is uneconomical. Second, such machines produce a lower-grade fillet surface texture than that which results from peeling the skin off the carcass as is done in the past by hand.

The present invention provides a machine which will deliver a dogfish body which has a surface texture equal to or better than the best which results from hand-skinning.

The present invention also provides a machine which will process dogfish at a rate which may be substantially faster than that possible with hand-skinning, thus lowering costs and reducing the time during which decay organisms can reduce the quality of the carcasses.

The machine is also capable of being installed on larger fishing vessels, thus enabling processing to be carried out soon after the fish is caught, thus even further retarding spoilage.

DISCLOSURE OF THE INVENTION

The apparatus of the invention comprises a machine and process in which a fish is placed on a conveyor with its head directed toward a wheel which prescribes a circular path along several processing stations. The tail is cut off and the conveyor energized. Sensing means are provided at the input to the wheel for providing an electrical signal when the nose of the fish is present.

The wheel carries a pneumatic cylinder at its perimeter; the end of the piston rod in this cylinder is sharpened into a spike. When this spike is in the correct location on the wheel to impale the fish at the throat, a coincidence circuit provides a first signal to operate a V-clamp suspended over the fish to hold the fish against the outside periphery of the wheel and a second signal to operate the piston which then secures the fish to the outer perimeter of the wheel. The fish body is then carried along the wheel to a fincutting station in which the dorsal fin passes through a slotted V-shaped clamp suspended pivotally above the fish and wheel.

Means are provided for sensing when the spike has passed the clamp. Promptly thereafter, a fin cutter motor, the blade of which is located adjacent the clamp, is engaged to sever the fin. The wheel continues to turn passing a pair of belly flap cutters which are disposed on opposite sides of the wheel and which cut the lower body of the fish to a sufficient depth to separate the belly from the back of the fish. Sensing means are provided for sensing when the head of the fish is next disposed opposite a slitter means carried on a gripper device located opposite the wheel and rotatable in two directions. When the head is correctly positioned, the wheel is stopped and a slit is made across the back near the back of the head of the fish, the slit being of such length that if the skin on the tail side of the slit is gripped and pulled toward the tail, separation of the skin from the flesh will occur. After the slit is made, the skinning device is rotated until a gripper on the drum is inserted in the slit. The gripper attachment is engaged to the skin at said tail side and the device and wheel operated in opposite directions. The gripper thus pulls the skin in a direction opposite the head of the fish which is being pulled by the spike on the wheel thereby removing the skin for the "round" fish.

BRIEF DESCRIPTION OF THE DRAWINGS

The invention is hereinafter described with reference to the accompanying drawings in which:

FIG. 2 is an isometric view, partly cutaway, of one form of the present invention with several components omitted for clarity;

FIG. 4 is an isometric view showing in some detail the head clamp, head stop and fin cutter of the apparatus in FIG. 2;

FIG. 5 is an isometric view showing in some detail a belly-flap cutter retainer of the apparatus in FIG. 2;

FIG. 8 is a cross-section of the gripper drum shown from the direction of arrow 356 in FIG. 7;

FIG. 9 is an isometric view of the wheel position sensors and hook assembly of FIG. 2;

FIG. 12 is a logic diagram of the program used in the control system of the invention.

BEST MODE OF CARRYING OUT THE INVENTION

Mechanical System

Figure 1:
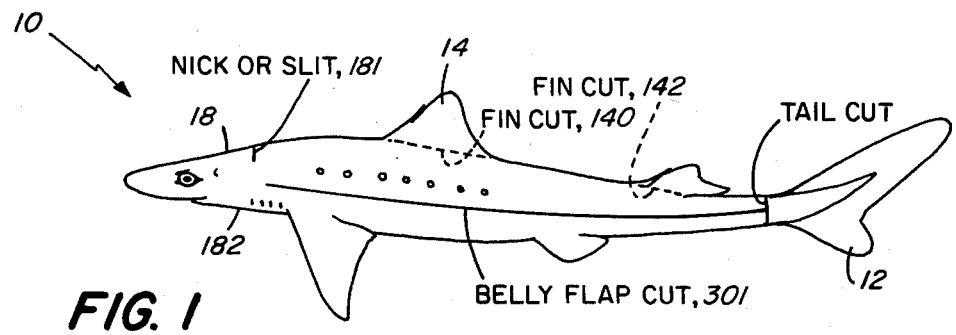
FIG. 1 is an illustrative view of a dogfish showing where the fish is cut in the process of the invention.

A discussion of the general mechanical aspects of the invention now follows to provide a foundation for the more detailed discussion later of the electrical and pneumatic aspects. With reference now to FIGS. 1 and 2, the machine shown at 100 serves, in one pass through the machine, to process the fish labelled 10. The machine 100 is useful for processing dogfish and the like where the skin of the fish is substantially stronger than the adhesion of the skin to its flesh. Basic to the machine is a wheel 34 that performs as a conveyor that receives a whole fish at its input and moves that fish to the various stations along a circular path as the wheel rotates in the direction of the arrow labelled 104; when the fish has traversed the whole of the path, its fins, entrails, tail and so forth, have been removed and it is in condition for further minor preparation and then packaging.

In order to do this, the machine must perform the following general operations on the fish as shown in FIG. 1:

sever the tail 12 approximately at the dotted line 120;

secure the fish by a spike inserted into the jaw at 182;

sever the dorsal fins 14 and 15 and associated spine or bone structure approximately at the dotted lines 140 and 142;

cut the belly flap on both sides of the fish to a depth sufficient to separate the belly from the back of the fish approximately along the dotted line 301;

slit the skin at the head 18 along the dotted line 181;

grip the skin at the head slit 181 and pull the skin in one direction while pulling the fish by the spike in the opposite direction.

The manner in which the foregoing processing is performed is now described with reference primarily to FIGS. 2–9. The fish 10 is placed on an infeed conveyor 36 with its tail on a cutting station 120, its nose forward and belly inward toward the surface labelled 34a of the wheel conveyor 34.

Figure 3:
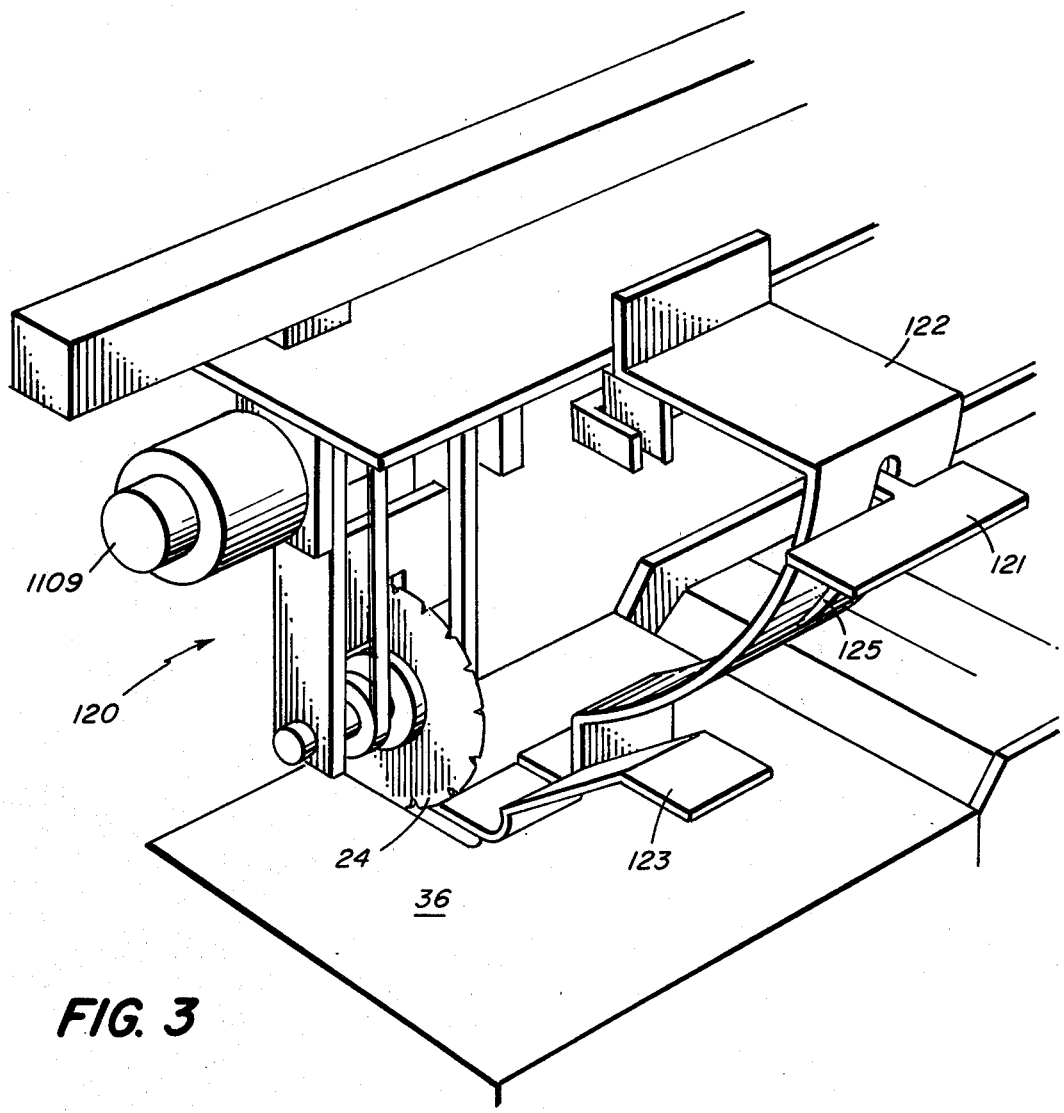
FIG. 3 is an isometric view of the tail cutter of FIG. 2.
Figure 10:
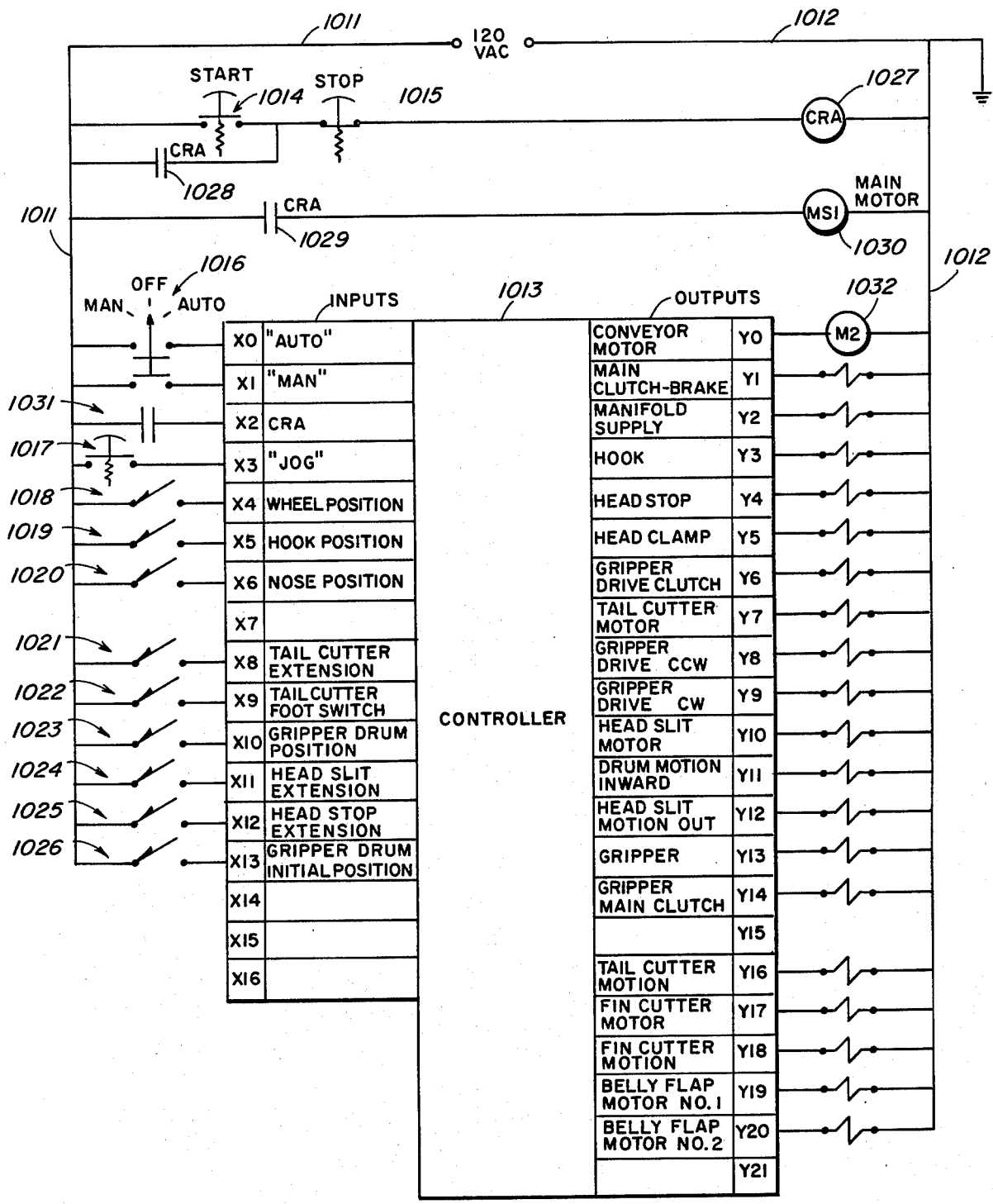
FIG. 10 is a schematic diagram showing the electrical control circuitry of the assembly of FIG. 2.

The operation of the tail cutter assembly can be seen more clearly in FIG. 3. The tail of the fish is inserted between tail holder bracket 122 and support bracket 123 which form a slot for the tail therebetween. A pneumatically operated tail clamp 121 extends through a guide slot 125 in bracket 122 and is pivotable downwardly along the slot in response to a signal from the controller 1013 (FIG. 10). Operation of a foot switch (not shown) starts motor 1109; after a time delay a tail cutter piston (not shown) and moves the rotary knife 24 in the direction of bracket 123 to remove the tail, and starts the conveyor 36 which moves the fish in the direction of the arrow labelled 341 until the nose hits a nose-stop sensor switch 1020 shown in FIG. 4.

During this portion of the processing operation, the wheel is stationary in its initial position. Once the nose of the fish actuates the sensor switch 1020 (FIG. 4), a head clamp 223 is moved radially inward by a pneumatic cylinder 1103 to secure the head of the fish tightly against the surface 34a.

Switch 1018 is positioned adjacent the perimeter of the wheel and senses the position of 4 angularly distributed cams (one of which is shown at 345 FIG. 9). The position of these cams determine the position on the fish where the fin cutter and gripper sequences are initiated. Switch 1019 mounted adjacent switch 1018 is closed by a rod 346 extending from cam 345 and indicates the initial position of the wheel. At this juncture, a pneumatic actuating cylinder 1101 (FIG. 9) moves a spike 26 in the direction of the arrow labelled 262 outwardly from the surface 34a of the wheel and into the jaw of the fish, the spike being lodged in that position through the remaining operations as the wheel rotates and serves to provide the necessary counterclockwise direction tangential force during those operations. Functionally, therefore, the spike acts like a hook and the two terms are hereafter used interchangeably.

Once the spike impales the fish, the wheel conveyor begins to rotate in the clockwise direction indicated by the arrow labelled 104 to encounter a fin cutter 28 shown more clearly in FIG. 4.

The fin cutter 28 consists of the rotary knife 281 driven by an air motor and a shaped, slotted pressure plate 283. Pressure plate 283 rides along the back of the fish exerting a force imposed by the piston on cylinder 1103 substantially radially inward holding the fish's belly firmly against the wheel surface 34. As the dorsal fins pass through the slot in the top of the pressure plate, they encounter the rotary knife which is substantially parallel to the surface of the fish's back. The rotary knife removes all of the dorsal fins, the bony spines and their associated attaching structure.

Next the fish encounters a V-shaped retainer 307 shown in more detail in FIG. 5. V-shaped retainer 307 is partially suspended from members 320 and 321. Member 321 is responsive to the piston on air cylinder 1127. Thus, as the fish moves in the direction shown by arrow 104, it first encounters the wide opening of retainer 307 and passes through while the piston holds it against the surface. As the diameter of the fish decreases with length, the piston on the air cylinder is extended to maintain the clamp firmly against the fish body.

Figure 6:
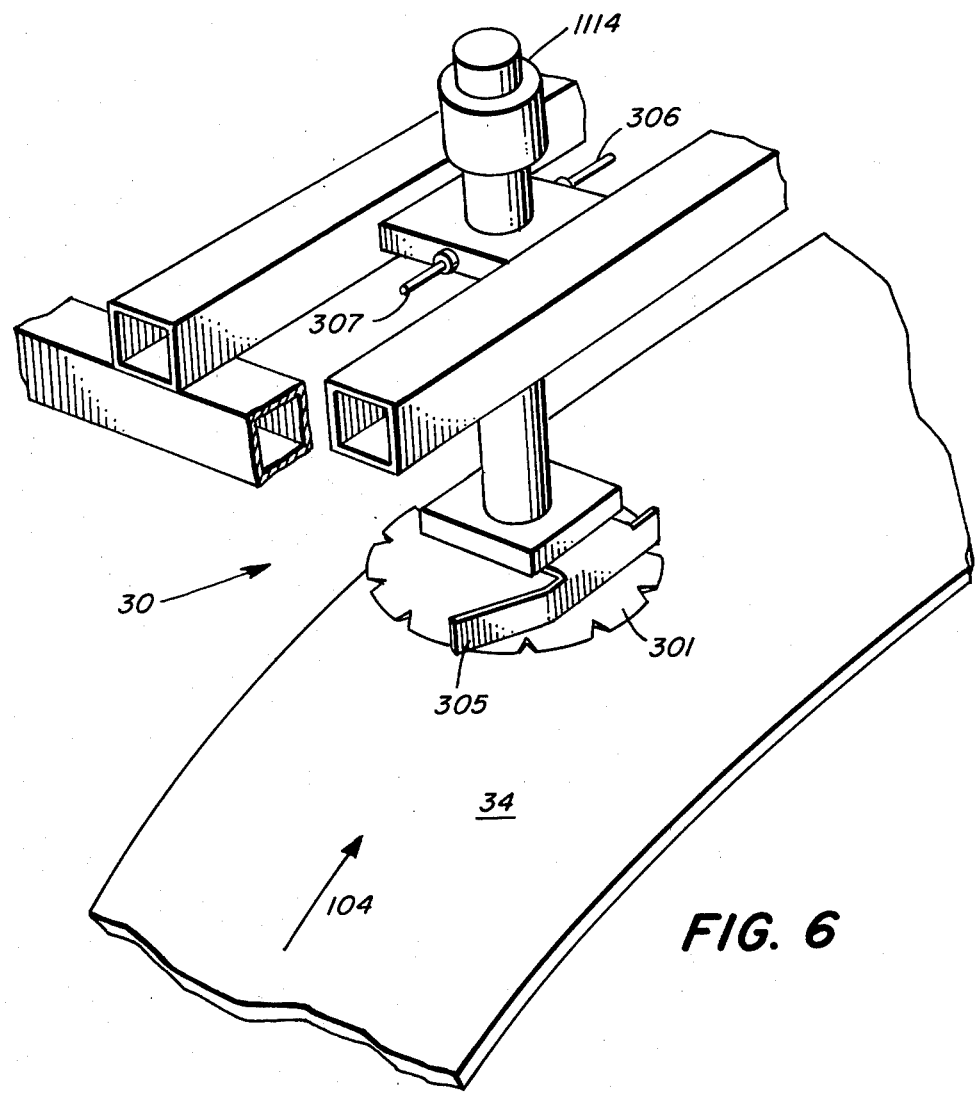
FIG. 6 is an isometric view showing in some detail the left belly flap cutter of the apparatus of FIG. 2.

Next, the fish encounters a pair of belly flap cutters, only one of which 32 is shown in FIG. 2, the other being shown in FIG. 6. Referring to FIG. 6, cutter 30 consists of a rotary blade 301 driven by air motor 1114. Cam 305 can be manually preset to adjust the depth of the belly flap cut as the wheel 34 continues its clockwise rotation in direction 104.

The entire cutter assembly is pivotable about the axis of stub shafts 306 and 307 by pressure of the fish on cam 305 thus accommodating varying fish diameter with length. Cutter 32 is substantially identical to cutter 30 but is located on the opposite side of the fish and is the first belly flap cutter encountered.

Figure 7:
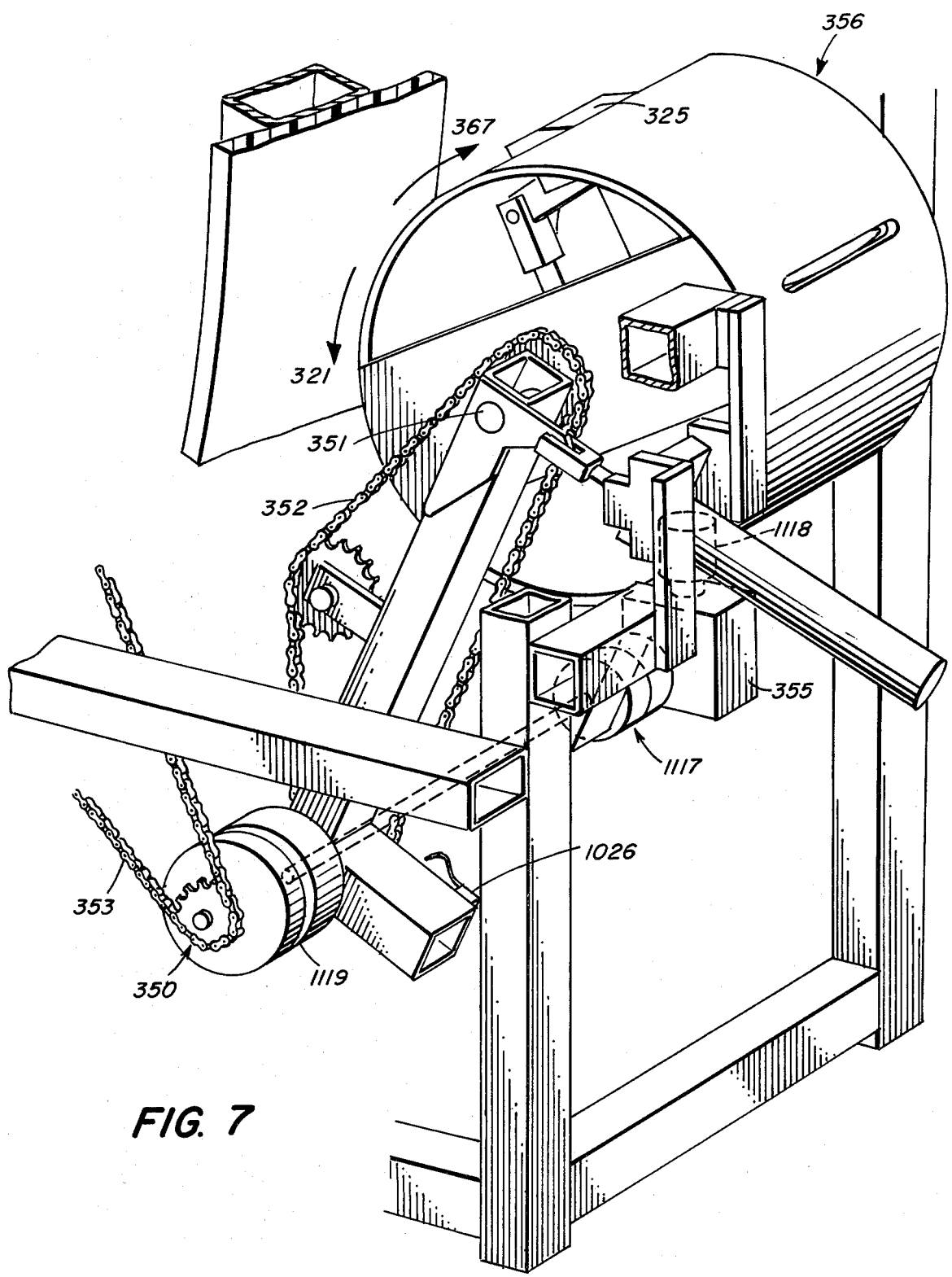
FIG. 7 is an isometric view of the gripper device and drive assembly of the apparatus in FIG. 2.

A most important aspect of the machine 100 is the drum 320 and parts associated therewith which shall be discussed in connection with FIGS. 2, 7 and 8.

Drum 320 is initially in a pivoted position away from contact with the fish as it proceeds on the wheel to the down position. Upon signal from the controller that the head is in the correct position adjacent the drum, the drum motion cylinder 1104 pivots the drum about shaft 350.

For the drum to be driven synchronously with the wheel, clutch 1119 is engaged thereby connecting the drum shaft 351 through two chains 352 and 353 to the main wheel shaft 354 (see FIG. 2).

For the drum to be driven by motor 1118, through gear box 355, gripper clutch 1117 must be engaged, and gripper clutch 1119 disengaged.

The drum is rotatable by motor 1118 either clockwise in the direction of the arrow labelled 367 or counterclockwise in the direction indicated by arrow 321. At the instant the fish reaches the drum 320, the drum is positioned such that a rotary cutter or nicking knife 322 is disposed adjacent the head of the fish. The knife is driven by an air motor 1110. The knife cuts a transverse slit across the back of the fish near the back of the head, the slit being of such length that if the skin on the tail side is gripped and pulled towards the tail, separation of the skin from the flesh will occur. The depth or length of the slit, thus cut, should be between $\frac{1}{2}''$ and $1\frac{1}{2}''$ long and $\frac{1}{8}''$ to $\frac{3}{8}''$ deep at the deepest part. The cutter 322 is moved in engagement with the fish and to an appropriate depth by a pneumatic actuating cylinder 1105.

Once an appropriate slit has been made, the drum rotates about 90 degrees in the direction 367 while the wheel is held stationary. Next, a skin gripper 325 on the skinning drum 320 moves into engagement with the slit on the fish. The gripper is a metal element whose forward or gripping end 326 is formed with two intersecting surfaces meeting at about a 25° angle to permit it to readily slip under the skin at the slit. Once the gripper has been inserted, the gripper is pivoted about axis 327 so that the gripping end moves toward the outer surface 328 of the drum and firmly secures the skin between the gripper and the drum surface.

Next, the wheel is rotated clockwise and the drum is also rotated clockwise in the direction of the arrow 367, thereby effecting relative motion between the drum surface and the fish in a direction substantially parallel to the backbone of the fish and in a direction to remove the skin from the head end of the fish toward the tail thereof. The skin wraps around the drum until it is removed from the fish body. Later, the gripper is pivoted back to its "open" position and the skin drops off or is forced from the drum by an air or water stream (not shown).

The wheel 34 is driven by shaft 354 attached to four radially extending spokes secured to the rim of the wheel. The diameter of the wheel is preferably long enough that the perimeter of the rim is much greater than the length of the longest fish likely to be processed.

It is to be understood that the wheel rim and supporting structures for the machine and other mechanical parts should be made of suitable materials heretofore used in food processing such as stainless steel or plastic.

There now follows a more detailed description of the cooperation of the foregoing machine elements which for convenience is broken up into three sections; the electrical system, the pneumatic system and the logic system.

ELECTRICAL SYSTEM

The operation of the electrical system will be described in connection with FIGS. 10 and 12. Line voltage of 120 volts AC is connected across the parallel circuits shown in FIG. 10 by wires 1011 and 1012. The "input" function side of the circuits are connected to the 1011 wire and the "output" or operative functioning devices are connected to ground via wire 1012.

A controller 1013 is provided for completing the appropriate parallel or series circuit paths and energizing an "output" function when pre-set conditions are obtained. The controller is a Texas Instruments controller 5TI-1013 programmed in accordance with FIG. 12.

A control relay is provided having a start switch 1014, a stop switch 1015, a selector switch 1016 with three positions, Manual (MAN) (in this position the circuit is completed from line 1011 to $X_1$ and $X_0$ is open), Off (in which the circuits to $X_1$ and $X_0$ are open) and Automatic (AUTO)(in which the circuit to $X_0$ is connected and $X_1$ is open) and a spring-loaded jog switch (1017)(which connects line 1011 to line $X_3$). Microswitches 1018–1026 are located on the conveyor or along the wheel at appropriate points as described in connection with the mechanical description.

On the left side of FIG. 10 are the individual respective microswitches shown in the "off" position. When they are in the "On" position, they complete the electrical path from 1011 to respective lines labelled $X_1$–$X_{13}$. The functions associated with each of these lines are labelled in each case on FIG. 10 adjacent each microswitch.

On the "output" side of the controller are connected the energizing coils of the 19 air solenoids $Y_1$–$Y_{14}$ and $Y_{16}$–$Y_{20}$ which operate the various air driven mechanisms required in the process.

Also connected to the "output" side of the controller at $Y_0$ is the electric motor conveyor $M_2$ windings.

It should be understood that the circuit path from the input side of controller 1013 $X_0$–$X_{13}$ to the output side $Y_0$–$Y_{20}$ is governed by the logic diagram of FIG. 12. However, for convenience, the details of FIG. 10 will now be described in terms of the results obtained when the logic is as prescribed in FIG. 12.

In order to start the system, the spring-loaded start button 1014 is depressed energizing control relay 1027 labelled CRA which is the only relay not connected with the controller 1013. The stop button 1015 contacts are connected in series between the CRA relay except when the stop button is depressed.

A set of contacts on CRA labelled 1028 latch the CRA in the energized position.

Now another set of contacts 1029 on CRA 1027 energize the motor starter 1030 of the three-phase motor (not shown) which is the main motor that drives the wheel. An additional set of contacts 1031 on CRA connects line voltage to line $X_2$. This connection is used extensively throughout the program of FIG. 11 to enable the various functions to occur. On line $X_3$ is the jog button 1017 which is physically located on the control box. This button allows the wheel to be stopped and started at the operator's desire. On line $X_4$ and $X_5$ are the two switches 1018 and 1019 that determine the wheel position and hook position. $X_5$ is only actuated once and that is when the wheel is at its correct position to pick up another fish. $X_4$ is actuated at various times in the sequence in the sequence to tell the controller where the position of the wheel is; for example, to indicate that the head is in the right position for the gripper sequence to occur. Microswitch 1022 is attached to the tail cutter foot switch and in the "on" position connects line 1011 to line $X_9$ of the controller and energizes the tail cutter motor solenoid $Y_7$. A signal at $X_8$ tells the controller that the tail cutter blade has come all the way out to the maximum position which is far enough out to cut off the biggest fish tail, and when that occurs, simply shuts the tail motor off by de-energizing the $Y_7$ solenoid and starts the conveyor running by energizing the conveyor motor 1032 at line $Y_0$. Switch 1023 on line $X_{10}$ indicates the gripper drum position. This switch determines where the gripper drum is in its proper rotation in order for the gripper blade to open and close and for the gripper clutch to disengage at the right moment. Switch 1024 on line $X_{11}$ works very much the same way as switch 1021. It senses when the rotary blade inside the drum is at its maximum extended position which is far enough to make a slit into the skin behind the head of the fish. Switch 1025 at $X_{12}$ senses when the head stop on the head clamp assembly is extended. In other words, when a fish enters the machine, it hits the head stop and is not allowed further. The nose switch 1020 is mounted on the assembly that has its position determined by head stop extension switch 1025. Switch 1020 in combination with switch 1025 controls the operation of the head clamp and conveyor motor. Switch 1026 at line $X_{13}$ indicates the gripper drum initial position. When the drum is rewinding, switch 1026 closes when the drum is in its initial position and the rewind motor stops.

Figure 11:
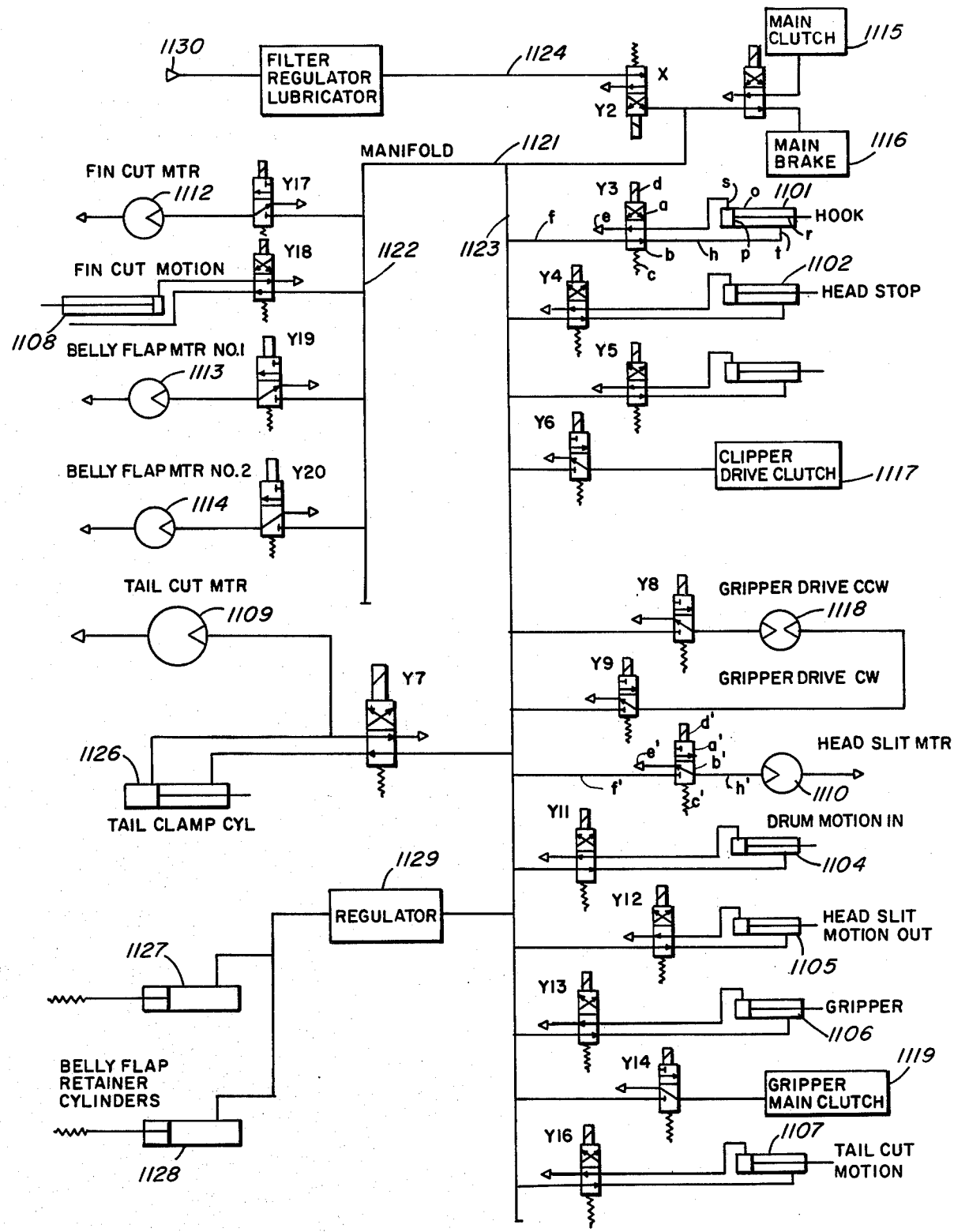
FIG. 11 is a pneumatic schematic of the assembly of FIG. 2.

Now, proceeding to the "outputs", $Y_0$ is connected to the conveyor motor 1032. Motor $M_2$ is an electric motor that is switched on and off when lines $X_6$ and $X_{12}$ are both enabled. The conveyor motor is a 1/6 hp electric motor. Line $Y_1$ is the connection to the main clutch/-brake solenoid $Y_1$, which controls the operation of the wheel clutch 1115 or brake 1116 (FIG. 11).

Line $Y_2$ is coupled to the solenoid of the $Y_2$ pneumatic valve which controls the flow of air to the manifold 1121 and enables all of the rest of the pneumatic system to work. When the operator pushes the start button 1028 CRA 1027 comes on and a set of contacts 1031 in CRA, which is at line $X_2$ as mentioned before, energizes the solenoid of valve $Y_2$. Thus, as long as the machine is running, the $Y_2$ valve is on letting the flow of air to the rest of the system.

$Y_3$ is the line connecting voltage to the solenoid of hook valve $Y_3$. Hook valve $Y_3$ operates a pneumatic cylinder mounted on the perimeter of the wheel. This cylinder has a sharpened piston rod that acts to impale the fish. Line $Y_4$ is connected to the solenoid of the $Y_4$ head stop valve. This valve controls the plate that comes out and prevents the fish from going into the machine. Mounted on that plate are switches 1025 (line $X_{12}$) which senses that the plate is all the way out, and switch 1020 (line $X_6$) which senses that the nose has just hit the plate. When those conditions occur along with the wheel being in the correct position, the piston of the head clamp valve cylinder 1103 comes down and clamps the fish against the wheel. The hook valve solenoid $Y_3$ then comes on, operating the hook cylinder 1101, thereby impaling the fish. $Y_6$ is the voltage connection to the gripper drive clutch solenoid $Y_6$. The gripper drum shaft has the ability to rotate freely, but whenever the shaft is driven with the gripper drive motor 1118 described in FIG. 11, it is necessary to engage the shaft with a clutch. $Y_6$ is the solenoid valve that supplies the air to the pneumatic gripper drive clutch 1117.

Line $Y_7$ supplies voltage to the solenoid valve $Y_7$ that turns on the tail cutter motor. When the operator steps on the tail cutter foot switch and closes switch 1022 (line $X_9$), the tail cutter valve $Y_7$ is energized, which starts the tail cutter motor 1109 running. After a time delay of one second, the solenoid of the tail cutter motion valve $Y_{16}$ is energized causing the blade on tail cutter motor 1109 to move out, cutting the tail off. When the tail cutter extension switch 1021 (line $X_8$) is closed indicating that the tail's been cut off, valves $Y_{16}$ and $Y_7$ are de-energized.

Lines $Y_8$ and $Y_9$ are connected to the solenoids of the $Y_8$ and $Y_9$ valves and control the operation of the gripper driver motor (FIG. 11). The gripper drive motor is an air motor geared through a clutch controlled by valve $Y_6$. Referring to FIG. 11, to drive the gripper drum counter-clockwise, valve $Y_8$ comes on. It rewinds the drum after it has gone through its rotation pulling the skin off. The drum continues to rotate until switch 1026 (line $Y_{13}$), the gripper drum initial position switch, is closed.

Line $Y_9$ is connected to the solenoid of valve $Y_9$ which as shown in FIG. 11 operates the opposite side of the gripper drum air motor 1118. Valve $Y_9$ operates the drive motor causing the gripper drum to rotate clockwise after the nick or slit has been made in the skin in the back of the head by head slit motor 1110. The drum is driven through its rotation until the gripper blade is engaged with the slit at which point valve $Y_9$ is shut off by the opening of switch 1023 (line $X_{10}$).

In order to have made that slit, solenoid valve $Y_{10}$ which controls the head slit motor 1110 is energized after the wheel has come to its correct position and after solenoid valve $Y_{11}$, which operates an air cylinder 1104 that pushes the drive against the fishes head, has been on for approximately two seconds. Valve $Y_{12}$ is energized after a time delay measured from the moment valve $Y_{10}$ is energized. Valve $Y_{12}$ is the solenoid valve which operates an air cylinder 1102 which causes the blade of head slit motor 1110 to come out of its slot making the cut or nick behind the head. Next, when the head slit extension switch 1024 is closed, valve $Y_{12}$ and valve $Y_{10}$ are de-energized, whereupon the controller causes $Y_9$, the gripper drive valve, to come on and rotate the drum clockwise. Now, as the drum rotates, when the switch 1023 (line $X_{10}$) is "on", the gripper valve $Y_{13}$ is energized. $Y_{13}$ operates a solenoid valve which in turn actuates an air cylinder causing the gripper to pivot open which enables it to drive into the nick previously made by $Y_{10}$ and $Y_{12}$.

When switch 1023 (line $X_{10}$) opens, the drum stops, the $Y_9$ valve is de-energized and the gripper valve $Y_{13}$ is de-energized closing the gripper. After a short time delay of about one second, the wheel begins to rotate. Valves $Y_1$ and $Y_{14}$, the main clutch, and the gripper clutch valves, are energized. The gripper clutch allows the gripper drum to be driven synchronously with the wheel. The drum continues to rotate until voltage on line $X_{10}$, which is controlled by the gripper drum position switch 1023, indicates that the drum has rotated through its full cycle, at which point, valve $Y_{14}$ which controls gripper main clutch 1119, is de-energized, and the drum is stationary until its receives a signal to rewind.

$Y_{17}$ is the connection for the $Y_{17}$ solenoid valve which operates the fin cutter air motor 1112.

Line $Y_{18}$ is the connection for the solenoid on the $Y_{18}$ fin cutter motion valve $Y_{18}$. As can be seen in FIG. 11, the $Y_{18}$ and $Y_{17}$ valves are connected to separate manifolds operated from the same air supply.

The fin cutter motor valve $Y_{17}$ comes on as soon as the hook has gone into the head of the fish and before the wheel has started rotating. After the wheel starts rotating, a voltage on line $X_4$ from the wheel position switch 1018 indicates to the controller that the hook has gone past the fin cutter and the controller permits the solenoid on the $Y_{18}$ valve to be energized. The $Y_{18}$ valve controls the fin cutter motion cylinder 1108 (FIG. 11) which moves the fin cutter slotted retainer against the fish pressing the fish against the wheel and allowing the fish cutter motor 1112 to cut the fins off.

Line $Y_{19}$ is the connection for the solenoid on the first belly flap motor valve $Y_{19}$ and $Y_{20}$ for the solenoid of the second belly flap motor valve. Solenoid valves $Y_{19}$ and $Y_{20}$ each control separate belly flap cutter motors 1113 and 1114 (FIG. 11). Valve $Y_{19}$ controls the first belly flap cutter that the fish encounters on the right side of the fish, and it is energized at the same time that valve $Y_{17}$, the fin cutter motor valve is energized. The second belly flap cutter is on the left side, and it is energized as soon as valve $Y_{18}$, the fin cutter motion valve is energized.

This completes the description of the electrical wiring connections shown in FIG. 10; it being understood that the sequence of operation and connections from the "input" side (lines $Y_0$ to $X_{13}$) through controller 1013 to the "output" side (lines $Y_0$ to $Y_{20}$) are dictated by the controller which operates in accordance with the logic diagram in FIG. 12 to perform the operations outlined above.

Next, we shall consider the pneumatics operation in connection with FIG. 11.

PNEUMATIC SYSTEM

Referring to FIG. 11, there is shown in schematic form the elements of the pneumatics required for the invention.

There are 19 solenoid valves $Y_1$-$Y_{14}$ and $Y_{16}$-$Y_{20}$. Some valves such as $Y_{10}$ are three-way valves and some, such as $Y_3$, are four-way valves. A specific embodiment of the invention uses valves manufactured by Humphrey Co., Kalamazoo, Mich. The solenoids on the valves operate on 60 cycle 110 volt AC; but 25 volt DC coils may also be used with appropriate modification of the voltage input. The system described is a pneumatic system; however it is also within the scope of the invention to utilize hydraulic valves, cylinders and motors, or a combination of both.

Valves $Y_3$, $Y_4$, $Y_5$, $Y_7$, $Y_{11}$, $Y_{12}$, $Y_{13}$, $Y_{16}$ and $Y_{18}$ are identical four-way valves so a description of one will suffice.

Referring specifically to valve $Y_3$, which is the hook valve, air from the manifold can be connected to the hook cylinder 1101 in two ways represented by the two boxes "a" and "b" in the main rectangle. In the unenergized condition of solenoid coil "d", the spring c pushes the air hose connections represented by box "b" into the flow pattern. This means that the line pressure "f" from manifold 1123 flows straight through to the right side of the hook air cylinder 1101 causing the piston "p" to retract. In its unenergized position, the hook is retracted, because the pressure is on the right side of the cylinder 1101 and the left side of the cylinder is at the atmospheric pressure of exhaust "e". When the coil "d" is energized, in other words, when voltage is on line $Y_3$ of FIG. 10, the air connections are switched to the position shown in the box labelled "a" as indicated by the two crossed arrows. The flow pattern is therefore reversed, so now the line that previously went to the right side "h" is now switched to the exhaust "e" and the supply line "f" is now connected to line "g" (which was previously to the exhaust "e") causing line "g" to be pressurized and the hook piston "p" or cylinder 1101 to extend. When the coil "d" is de-energized, the spring "c" takes over again, in effect, flipping the boxes so now the hook on cylinder 1101 retracts.

The three-way valves $Y_2$, $Y_{66}$, $Y_8$, $Y_9$, $Y_{10}$, $Y_{14}$, $Y_{17}$, $Y_{19}$ and $Y_{20}$ are also identical in function and a description of valve $Y_{10}$ will suffice for all.

Valve $Y_{10}$ is a three-way valve, which is represented by a standard schematic that comprises once again two boxes labelled a' and b', a coil, d', and a spring, c'. In its unenergized position, the manifold air pressure is connected as shown in box b', and the line pressure, f', has no flow path through $Y_{10}$. It is stopped, and line "h'" is connected through the valve $Y_{10}$ to e', the exhaust. And so, nothing happens. When solenoid d' is energized, in effect, the boxes a' and b' are reversed or flipped, and now the flow pattern from the manifold f' is through the arrow in box a' to h'. This causes the motor 1110 to rotate and the exhaust e' is blocked. When the coil d' is de-energized, the spring c' pushes to in effect flip the boxes a' and b' and the motor air connections are coupled to the exhaust e' and the supply pressure is blocked.

Eleven standard stainless steel pneumatic cylinders manufactured by Bimba Co. of Monee, Ill., are used in the invention. The air cylinders are: the hook 1101, head stop 1102, head clamp 1103, drum motion 1104, head slit motion 1105, gripper 1106, tail cut motion 1107, fin cut motion 1108 tail clamp 1126, and belly flap retainers 1127 and 1128.

Since the cylinders are substantially identical in operation, a description of one will suffice. Referring to the hook cylinder 1101, it consists of a cylindrical tube "o" that has inside of it, a piston "p" and attached to that piston is a rod "r". At both ends of the cylindrical tube are fittings "s" and "t" for an air supply. When the air supply is introduced to one side of the tube at "t", it causes the piston to move to the left (as shown). The air expands into that volume causing the piston to move away from the air inlet. Then when the coil "d" of the $Y_3$ valve is energized, the supply of air is switched to the other side "s" of the tube causing the piston to move in the opposite direction. The force that an air cylinder is able to exert is dependent on its size, since the force is equal to the pressure from the manifold times the piston area. The bigger the diameter of the cylinder, the greater the area, the greater the force exerted. Typically, the line pressure for these cylinders is rated at 150 psi which is the maximum that they would encounter in this system. But, once again, hydraulic cylinders could be substituted, in which case, they would be rated anywhere up to 3,000 psi.

Four-way valve $Y_7$ in its unenergized position permits manifold air to maintain only the tail clamp cylinder 1126 in its unclamped position. When energized valve $Y_7$ switches air from the manifold to the tail clamp cylinder 1126 to secure the tail in the tail cutter. $Y_7$ also operates the tail cut motor 1109.

Air from manifold line 1123 is regulated by a diaphragm-type regulator 1129 which supplies regulated air to belly flap retainer cylinders 1127 and 1128. The regulator permits the operator to adjust the force created by the retainers to achieve optimum retention.

A supply of air to the manifold from line 1124 is indicated at 1130. This air is first passed through an appropriate filter, regulator and lubricator shown at 1120.

The remaining operative elements of FIG. 11, such as the gripper main clutch 1119, gripper drive motor 1118, gripper drive clutch 1117, head slit motion cylinder 1105, head slit motor 1110, gripper 1106 have been previously decribed in connection with FIG. 10.

Accordingly, we will now proceed to a description of the logic circuit of FIG. 12.

LOGICS SYSTEM

FIG. 12 is a logic diagram illustrating the preset conditions that have to occur in order for a given function to take place. The uncircled elements on the left side of the drawing, such as, X3, CR26, X0 indicate the preset switching conditions in logic form and the circled elements such as CR26, MCR55 and Y2 are the operative elements which are energized when these conditions occur on the left side.

The elements with an X symbol and a numeral are the contacts X0–X13 described in FIG. 10. The elements with a CR symbol and a numeral are the contacts internal to controller 1013 of FIG. 10. The elements labelled with a Y prefix and a numeral are the solenoids or motor windings $Y_0$–$Y_{20}$ of FIGS. 10 and 11.

In the symbology, a pair of parallel opposing vertical lines (such as X0 line 1202) means that a circuit element is closed, or "on", or energized. A pair of parallel opposing vertical lines with a slanted line drawn therethrough such as CR8 line 1208, means that a circuit element is open, or "off", or de-energized.

As can be seen each of the lines 1202–1285 has a logic circuit associated with it; which if the conditions shown are present, in other words if the line is "true" the line voltage on line 1201 from voltage source 1286 is connected through the circuit to the respective elements shown on the right hand side of the drawing.

Since each circuit operates in a similar manner it will suffice, for one skilled in the art, if a representative circuit is described in detail. For example, referring to lines 1217 and 1218, when CR4 (a set of contacts in the controller) are closed as indicated in line 1217 the timer 1287 (also in the controller) is energized or enabled provided the conditions on line 1218, the reset enable line, are present. These conditions are that, the CR8 contacts are open and the X2 contacts are closed. If these conditions are met, after ½ second, the timer 1287 energizes hook solenoid valve Y3 causing the hook to go out.

After the Y3 solenoid valve has been energized it will continue to stay on even if CR4 goes off; as long as line 1218 remains true. In other words, if CR8 is not on, and X2 is on, then the timer is enabled. If CR8 comes on, line 1218 is no longer true, and solenoid Y3 goes off, causing the hook to retract.

Physically, looking at this timer circuit for the solenoid Y3, what happens is that once the nose switch 1020 and the wheel position switch 1018 are in the right place, in other words, when line 1215 is true and the contacts on switch 1020 (X6) and CR1 are closed, CR4 comes on. Then a half a second later the hook goes out. And the hook stays out as long as CR8 is not on and switch 1031 (X2) is on. Switch 1031 (X2) is one of the main contact switches from CRA (1027). It is the enable switch for the whole machine. CR8 is the reset control relay, and indicates that the machine is about to pick up another fish, so everything should reset. CR8 is controlled by the logic on lines 1274 and 1275 if all the conditions on lines 1274 and 1275 are true, CR8 will come on. If CR8 comes on, line 1218 for the timer 1287 is no longer true, thereby causing the hook solenoid Y3 to be de-energized, which causes the hook to retract, the fish drops off, and the machine is ready for another fish.

The timers 1287–1296 are programmed into the controller and are adjustable in increments of 0.1 second. The machine will thus accomodate time delays anywhere from 0.1 second up to, about 12 hours, in steps of one tenth of a second.

A safety feature embodied and described in connection with FIGS. 10, 11 and 12 in the logic will be described below. This feature is related to the X2 contacts shown in lines 1204 and 1205 and 1206 of FIG. 12.

The X2 contact 1031 is physically located on the CRA 1027 and is shown, for example, on line 1206 of FIG. 12. When the X2 contact is closed the Y2 solenoid is energized. Looking at FIG. 11, it can be seen that Y2 is a solenoid valve that allows the line pressure on line 1124 to go to the manifold via conduit 1125. If solenoid valve Y2 is not on, then no pressure is available to the manifold 1121 to enable all the rest of the system. Thus, whenever the operator hits the stop button 1015, Y2 lets all of the pressure in the manifold out, and so none of the pneumatics is operable. But when the operator pushes the start button 1014 in FIG. 10, line 1206 becomes true, since CRA, which is an external control relay, not inside the programmer, becomes energized and latches on a set of its own contacts 1028. The way the operator shuts the machine off is by pushing the stop button 1015 which opens the CRA 1027. Another set of contacts in CRA is 1031 at X2. The first function of X2 is to energize the master control relay MCR 55 (FIG. 12) through line 1204. The next function of X2 is to energize the manifold supply valve Y2. So, whenever X2 goes off, in other words, whenever the stop button is pushed, Y2 opens and the manifold pressure is dumped to atmosphere and also X2 de-energizes MCR 55 dis-enabling all relays or outputs following MCR 55. This is a safety feature since if an air motor were running and there was any kind of emergency, the operator simply pushes the stop button and all the air supply is shut off and all, outputs are dis-enabled.

This completes the description of a preferred embodiment of the invention, it will be obvious to those skilled in the art without departing from the invention in its broader aspects, to devise equivalents thereto. Such equivalents are part of this invention and are intended to be covered by the following claims.

We claim:

1. Skin removing apparatus comprising:
    a. a conveyor for securing a body and moving it along a prescribed path;
    b. securing means for securing one end of the body to said conveyor;
    c. slitting means for making a crosswise cut along one of the narrow sides of said body below the end secured by the securing means;
    d. gripper means, movable in a direction opposite the conveyor, for gripping the skin at the cut made by the slitting means; and in which the conveyor is a rotatable wheel, the body moves in an arc and the gripper means is mounted on a drum which rotates in the opposite direction to the wheel when the gripper has gripped the skin.

2. The apparatus of claim 1 in which the slitting means is also mounted on the drum in fixed relationship with the gripper means.

3. Skin removing apparatus comprising:
    a. a conveyor for securing a body and moving it along a prescribed path;

b. securing means for securing one end of the body to said conveyor;
c. cutting means having a first means for removing selected appendages on said body and a second means for making lengthwise slits along the longest sides of said body;
d. slitting means for making a crosswise cut along one of the narrow sides of said body below the end secured by the securing means;
e. gripper means, movable in a direction opposite the conveyor, for gripping the skin at the cut made by the slitting means; and in which the first means of said cutting means is a V-shaped clamp having a lengthwise slot through which the appendage to be removed is constrained.

4. The apparatus of claim 3 in which the clamp is movably adaptable to the shape of the body and exerts a force on the body against the outward surface of the conveyor.

5. The apparatus of claim 4 in which sensing means are provided to determine when the securing means has traversed past the first means of said cutting means.

6. A skin gripper comprising:
a. a cylinder adapted to rotate about its axis in either direction;
b. a first opening on said cylinder;
c. a second opening on said cylinder;
d. piston means mounted within the cylinder for extending a cutting blade through said first opening;
e. second piston means mounted within the cylinder and extending through said second opening for a gripper mounted on the outer surface of the cylinder.

7. The apparatus of claim 6 having pivot means to pivot the cylinder in either of two directions.

8. The apparatus of claim 7 in which the cutting blade operated by said first piston means is driven by a fluid pressure motor to cause a slit in a body adapted to be momentarily held in a fixed position adjacent the cylinder.

9. The apparatus of claim 8 in which drive means are provided to rotate the cylinder until the pivotable gripper is positioned adjacent the slit made by said cutting blade.

10. The apparatus of claim 9 in which sensing means are provided to determine when the gripper is positioned in the slit.

11. Apparatus for skinning bodies that comprises:
a. conveyance means having a surface to receive the body and move it along an arcuate path;
b. means for holding the body against said surface;
c. means associated with said conveyance means for impaling the body at one end thereof to secure the body at the surface of the conveyance means;
d. means for removing selected appendages on the body;
e. knife means positioned to make a pair of longitudinal cuts along each flank of the body, into the belly cavity thereof and along substantially the full length of the body;
f. means to cut a slit across the back of the body near the back of the head, the slit being of such a length that if the skin on the tail side of the slit is gripped and pulled towards the tail, separation of the skin from the flesh will occur;
g. gripper means that grips the skin along the length of said slit on the tail side of said slit;
h. means to effect relative motion between the gripper means and the fish in a direction substantially parallel to the backbone in a direction to remove the skin from the head of the fish toward the tail thereof.

12. Apparatus as claimed in claim 11 in which both the means to cut and the gripper means are mounted on a rotatable cylinder whose axis of rotation is substantially orthogonal to the backbone orientation of the body, said means to cut comprising a retractable and rotatable blade whose axis of rotation is substantially parallel to said backbone orientation.

13. Apparatus as claimed in claim 12 in which the gripper means comprises a blade secured to the outer surface of the rotatable cylinder and pivotally connected on an axis substantially parallel to the axis of rotation of the rotatable cylinder and means to pivot the blade about its axis respectively to grip the skin of the fish at said slit and to release the skin after it has been completely separated from the flesh.

14. Apparatus as claimed in claim 13 in which the perimeter of the rotatable cylinder is at least as large as the length of the longest fish to be skinned.

15. Apparatus as claimed in claim 13 having means to rotate the rotatable cylinder about its action of rotation to effect relative motion between the fish and the rotatable cylinder such that the skin of the fish is pulled back on itself.

16. Apparatus as claimed in claim 15 wherein the conveyance means comprises a cylindrical surface whose perimeter is much greater than the perimeter of the rotatable cylinder and much greater than the length of the longest fish to be skinned, the axis of rotation of the cylindrical surface being substantially parallel to the axis of rotation of the rotatable cylinder.

17. A machine in which a fish is placed on a conveyor with its head directed toward a wheel which prescribes a circular path along several processing stations;
sensing means at the input to the wheel for providing an electrical signal when the nose of the fish is present;
a pneumatic piston with a sharpened spike carried on the wheel, to impale the fish at the throat;
a coincidence circuit to provide a first signal to operate a V-clamp suspended over the fish which holds the fish against the outside periphery of the wheel, and a second signal to operate the piston which then secures the fish to the outer perimeter of the wheel;
a fin cutting station in which the dorsal fins of the fish pass through a slotted V-shaped clamp suspended pivotally above the fish and wheel;
means for sensing when the spike has passed the V-clamp;
means for promptly thereafter severing the fin;
a pair of belly flap cutters disposed on opposite sides of the wheel and which cut the lower body of the fish to a sufficient depth;
sensing means for sensing when the head of the fish is next disposed opposite a slitter means carried on a gripper drum located opposite the wheel and rotatable in two directions such that when the head is correctly positioned, the wheel is stopped and a slit is made across the back near the back of the head of the fish, the slit being of such length that if the skin on the tail side of the slit is gripped and pulled toward the tail, separation of the skin from the flesh will occur, and;
a gripper means for engaging the skin at said tail side while the wheel is operated in an opposite direction from the drum such that the gripper pulls the skin in a direction opposite the head of the fish which is being pulled by the hook on the wheel thereby removing the skin from the fish.

* * * * *